(12) United States Patent
Otsubo et al.

(10) Patent No.: US 7,249,420 B2
(45) Date of Patent: Jul. 31, 2007

(54) SLIDER DEVICE AND MEASURING INSTRUMENT

(75) Inventors: Seiichi Otsubo, Utsunomiya (JP); Koji Takesako, Utsunomiya (JP); Mitsuru Fukuda, Utsunomiya (JP)

(73) Assignee: Mitutoyo Corporation, Kawasaki-shi (JP)

( * ) Notice: Subject to any disclaimer, the term of this patent is extended or adjusted under 35 U.S.C. 154(b) by 190 days.

(21) Appl. No.: 11/099,762

(22) Filed: Apr. 6, 2005

(65) Prior Publication Data

US 2005/0225901 A1 Oct. 13, 2005

(30) Foreign Application Priority Data

Apr. 9, 2004 (JP) .............................. 2004-115968

(51) Int. Cl.
*G01B 5/004* (2006.01)
(52) U.S. Cl. .......................... 33/503; 33/1 M; 33/556
(58) Field of Classification Search ................. 33/503, 33/1 M, 555, 556, 702, 832
See application file for complete search history.

(56) References Cited

U.S. PATENT DOCUMENTS

| 4,133,112 | A | * | 1/1979 | Matthiessen | 33/1 M |
| 4,587,622 | A | | 5/1986 | Herzog | |
| 4,679,326 | A | * | 7/1987 | Takizawa et al. | 33/832 |
| 4,852,267 | A | * | 8/1989 | Tezuka | 33/503 |
| RE33,254 | E | * | 7/1990 | Brandstetter | 33/503 |
| 5,699,621 | A | * | 12/1997 | Trumper et al. | 33/1 M |
| 6,049,988 | A | * | 4/2000 | Shirai | 33/1 M |
| 6,157,157 | A | * | 12/2000 | Prentice et al. | 318/625 |
| 6,327,929 | B1 | * | 12/2001 | Yanagisawa | 74/490.09 |
| 6,408,530 | B1 | * | 6/2002 | Matzkovits et al. | 33/503 |
| 6,463,667 | B1 | * | 10/2002 | Ushio et al. | 33/502 |
| 6,609,304 | B1 | * | 8/2003 | Mishler | 33/1 M |
| 6,694,627 | B2 | * | 2/2004 | Ito et al. | 33/1 M |
| 6,694,927 | B1 | * | 2/2004 | Pouchak et al. | 122/448.1 |
| 6,941,669 | B2 | * | 9/2005 | Shivaswamy et al. | 33/502 |
| 7,051,448 | B2 | * | 5/2006 | Ogura | 33/503 |
| 7,210,239 | B2 | * | 5/2007 | Otsubo et al. | 33/503 |
| 2005/0235514 | A1 | * | 10/2005 | Otsubo et al. | 33/712 |

FOREIGN PATENT DOCUMENTS

| EP | 1 246 519 A2 | 10/2002 |
| JP | 9-166137 | 6/1997 |
| JP | 2002-299893 | 10/2002 |
| JP | 2003-172350 | 6/2003 |
| JP | 2003-311574 | 11/2003 |

* cited by examiner

*Primary Examiner*—G. Bradley Bennett
*Assistant Examiner*—Amy R. Cohen
(74) *Attorney, Agent, or Firm*—Rankin, Hill, Porter & Clark LLP (57) ABSTRACT

A slider device includes a base (200), a running head (300) slidably provided on the base (200), a main guide mechanism (410) for guiding in a first direction in which the running head (300) runs, and sub-guide mechanism (450) allowing displacement to a second direction different from the first direction. The main guide mechanism (410) includes two main rails (421, 422) provided on the base (200) substantially parallel to each other along the first direction, and main sliders (431, 433) sliding on the main rails (421, 422). The sub-guide mechanism (450) includes a sub-rail (461) provided on the main slider (431) along the second direction, and a sub-slider (471) sliding on the sub-rail (461).

4 Claims, 7 Drawing Sheets

SLIDER DEVICE AND MEASURING INSTRUMENT

BACKGROUND OF THE INVENTION

1. Field of the Invention

The present invention relates to a slider device and a measuring instrument.

2. Description of Related Art

Conventionally, there has been a well-known slider device (see, for example, Reference 1: Japanese Laid-open Patent Publication No. 2002-299893, Reference 2: Japanese Laid-open Patent Publication No. 2003-172350, Reference 3: Japanese Laid-open Patent Publication No. H09-166137, and Reference 4: Japanese Laid-open Patent Publication No. 2003-311574).

Figure 7:
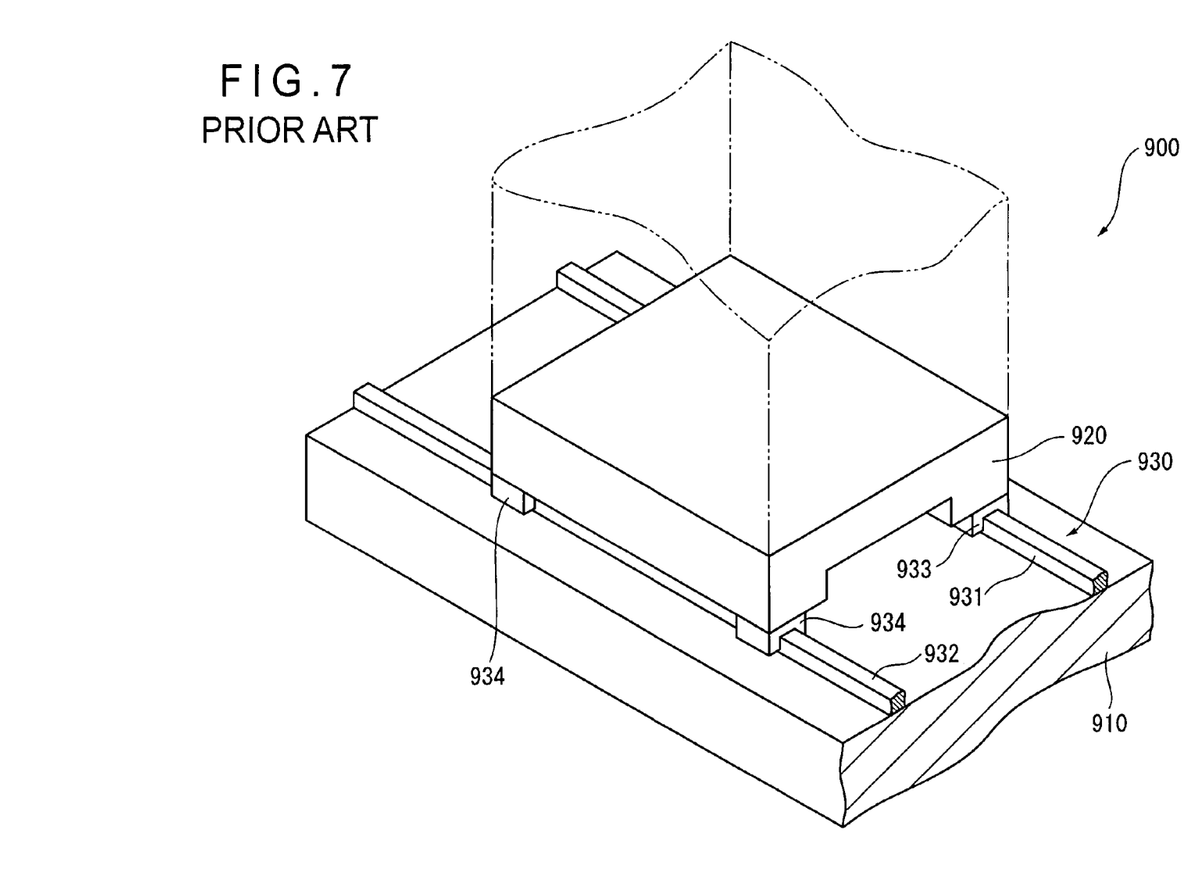
FIG. 7 shows a slider device in the prior art.

FIG. 7 shows a conventional slider device based on the conventional technology.

A slider device 900 includes a longitudinally extended base 910 having a flat upper surface, a running head 920 running back and forth along a longitudinal direction of the base 910, a guide mechanism 930 for guiding a running direction of the running head 920, and a driving unit (not shown) for driving the running head 920.

The guide mechanism 930 includes two rails 931, 932 laid in parallel to each other on the upper surface of the base 910 and sliders 933, 934 provided over and sliding on the rails 931, 932. The sliders 933, 934 are attached to a bottom surface of the running head 920, and the running direction is guided by sliding those sliders 933, 934 along the rails 931, 932.

The driving unit includes a rack (not shown) provided between the rails 931, 932 in parallel to the rails 931, 932, a pinion (not shown) engaging with the rack, a motor (not shown) for driving to rotate the pinion (not shown).

The motor is fixed on the running head 920, and a rotor of the motor is connected to the pinion.

A tooth surface of the rack is provided on one side surface of the rack (a surface facing either one of the rails), and a direction of rotation axis of the pinion is perpendicular to an upper surface of the base 910.

In this configuration, when the motor rotates for driving, the pinion is rotated. Then, the pinion moves along the rack because of engagement with the rack. The running head 920 runs with the motor as the pinion moves. A direction of the running head 920 is guided along the direction of the rails 931, 932 as the running head 920 slides along the rails 931, 932.

The base 910 and the running head 920 were conventionally made of the same materials. For instance, the running head 920 and the base 910 were made of low thermal expansion materials which thermally deform little.

However, the running head 920 is desired to run at a higher speed in recent years. In order to achieve the object, it is necessary to make the running head 920 with light materials. However, when the running head 920 is made of light materials, the problem may arise that the running head 920 and the base 910 have different thermal expansion rates in response to a temperature change since the different materials are used for the running head 920 and the base 910.

Specifically, if thermal expansion of the running head 920 and that of the base 910 are different in the lateral direction, a force acting in the orthogonal direction to the rails 931, 932 is loaded to the rails 931, 932 and thus stress is generated in the rails 931, 932 and the sliders 933, 934, thereby the problem may arise that durability and geometric accuracy of the guide mechanism 930 (the rails and the sliders) are reduced. Then, another problem will also arise that running accuracy of the running head 920 becomes lower.

SUMMARY OF THE INVENTION

An object of the present invention is to provide a slider device and a measuring instrument with improved running accuracy of a running head and also with improved durability and higher accuracy in measurement.

A slider device according to an aspect of the present invention includes a base section, a running head slidably provided on the base section, a main guide mechanism for guiding in a first direction in which the running head moves and a sub-guide mechanism allowing displacement in a second direction different from the first direction, in which the main guide mechanism includes two or more main rails provided on the base section substantially in parallel to each other along the first direction, and main sliders for respectively sliding the main rails, and the main sliders sliding on an arbitrary one of the main rails is provided on the running head, and also the sub-guide mechanism is provided between the running head and the other slider.

In this configuration, a running direction of the running head is guided by the main slider sliding on the arbitrary one of the main rails.

When an amount of deformation is different between the running head and the base section, since the sub-guide mechanism is allowable to absorb the amount of deformation, the difference in the amount of deformation between the running head and the base section can be absorbed. Because of this feature, the difference in the amount of deformation between the running head and the base section does not affect the mail rails, the main guide mechanism is not damaged and the durability is enhanced with the geometric precision maintained. As a result, a running precision of the running head is improved.

Since the difference in the amount of deformation between the running head and the base section is allowable, the running head can be made of light materials (such as aluminum alloy). As a result, the running head can be operated at a higher speed.

In a case when parallelism between the main rails is not accurate, since the difference in a space between the main rails can be absorbed by the sub-guide mechanism, the running accuracy of the running head is maintained regardless of the accuracy of parallelism between the main rails. As a result, lower accuracy of parts and assembly is allowable, which enables parts cost and assembly cost to be reduced.

In the present invention, the sub-guide mechanism is preferably provided on one of the main sliders sliding other than that sliding on the arbitrary one of the main rails, the sub-guide mechanism including a sub-rail extending along the second direction different from the first direction, and a sub-slider sliding on the sub-rail. The sub-slider is provided on the running head.

With the configuration, since the sub-slider slides on the sub-rail, a difference in the amount of deformation between the running head and the base section is allowable and then stress acting over the main guide mechanism is prevented.

Any angle of the second direction relative to the first direction is allowable, but preferably the second direction projected to the base section is substantially orthogonal to the first direction projected to the base section 1. With this configuration, stress acting in the orthogonal direction to the main rails can be absorbed by the sub-guide mechanism.

A measuring instrument according to the present invention includes the above-described slider device of the present invention, a measuring section moved by the running head and having a detecting section for detecting a workpiece by scanning a surface of the workpiece, and a position detector for detecting coordinate positions of the detecting section.

With this configuration, the same advantages as the aforementioned invention can be obtained. Because the slider device has high accuracy in sliding, the workpiece can be measured with high accuracy.

DETAILED DESCRIPTION OF PREFERRED EMBODIMENT

An embodiment of the present invention is described with reference to the reference numerals attached to various components in the drawings.

An embodiment according to the present invention is described with reference to FIGS. 1 to 6.

Figure 1:
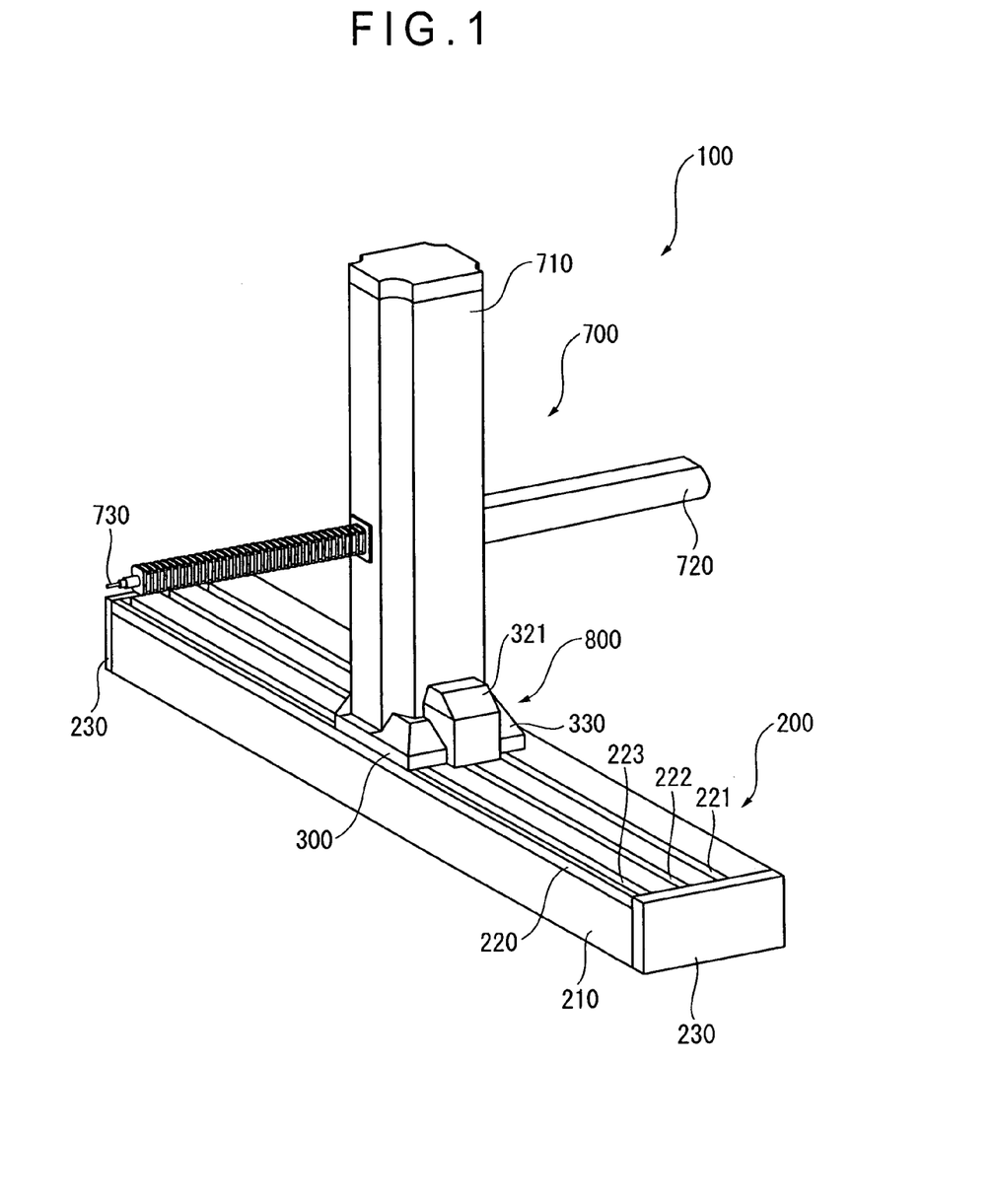
FIG. 1 is a general view showing a measuring instrument according to an embodiment of the present invention.
Figure 2:
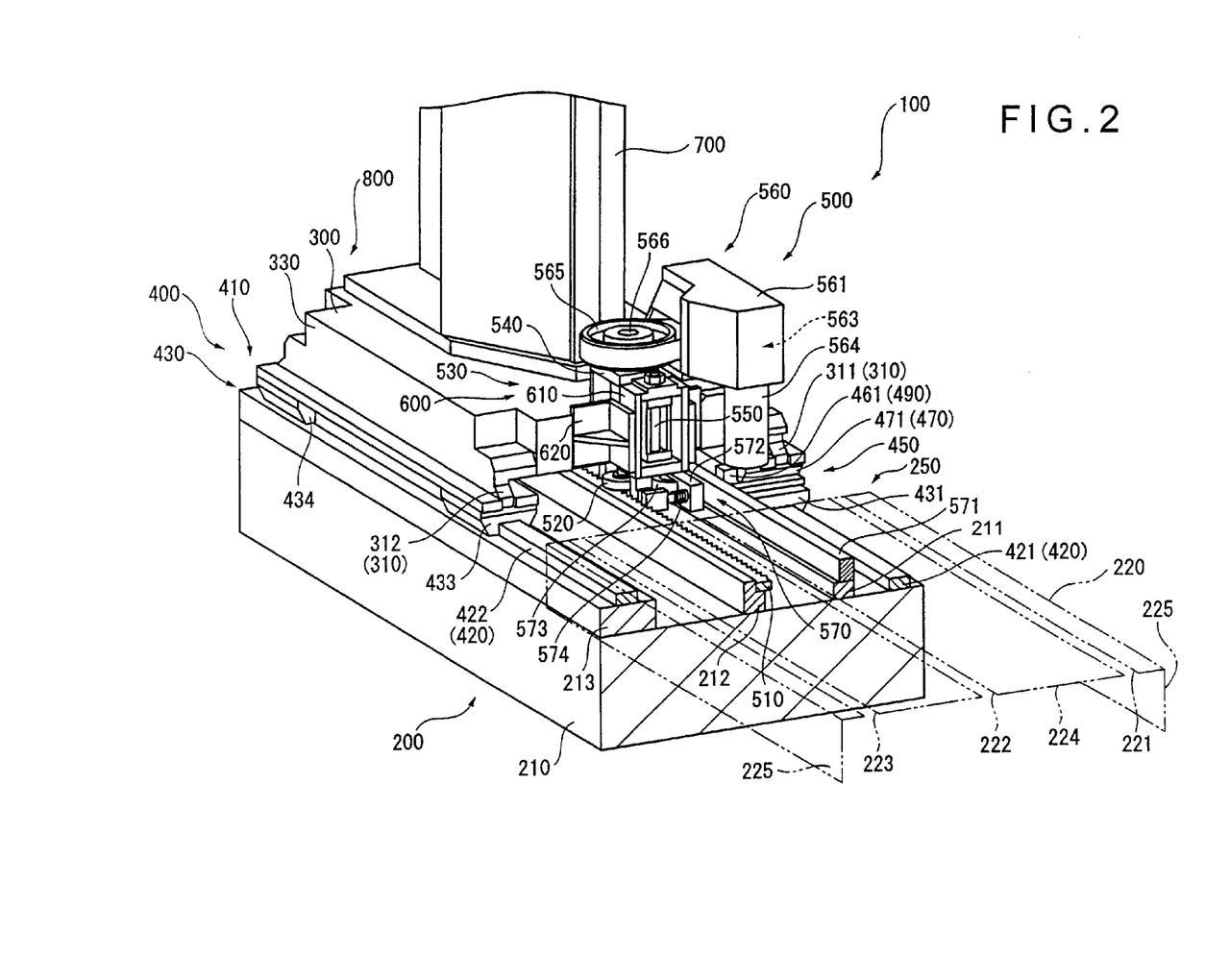
FIG. 2 is an enlarged view showing a running section and a base with a base cover removed therefrom in the embodiment.
Figure 3:
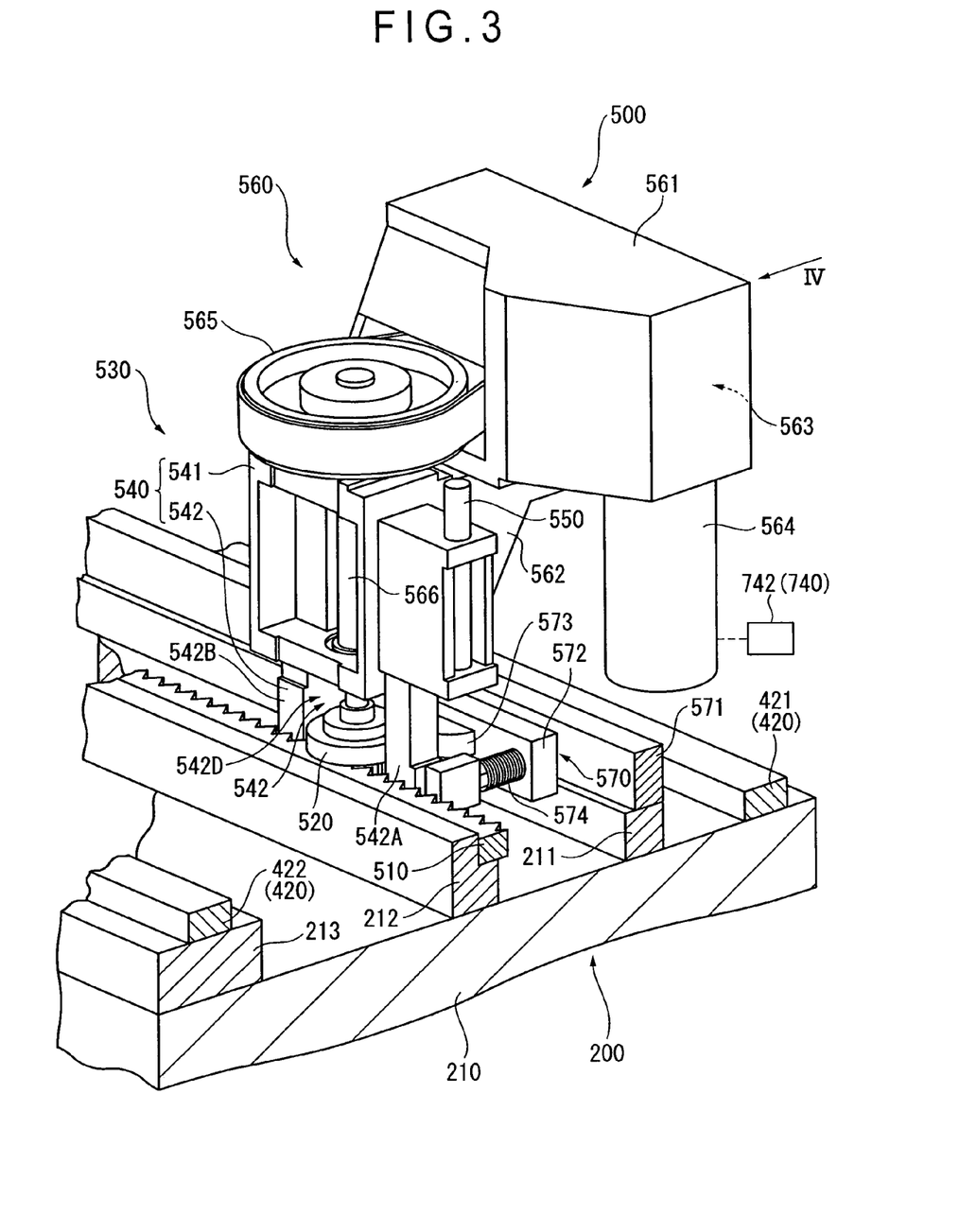
FIG. 3 is a partial view showing a drive unit in the embodiment.
Figure 4:
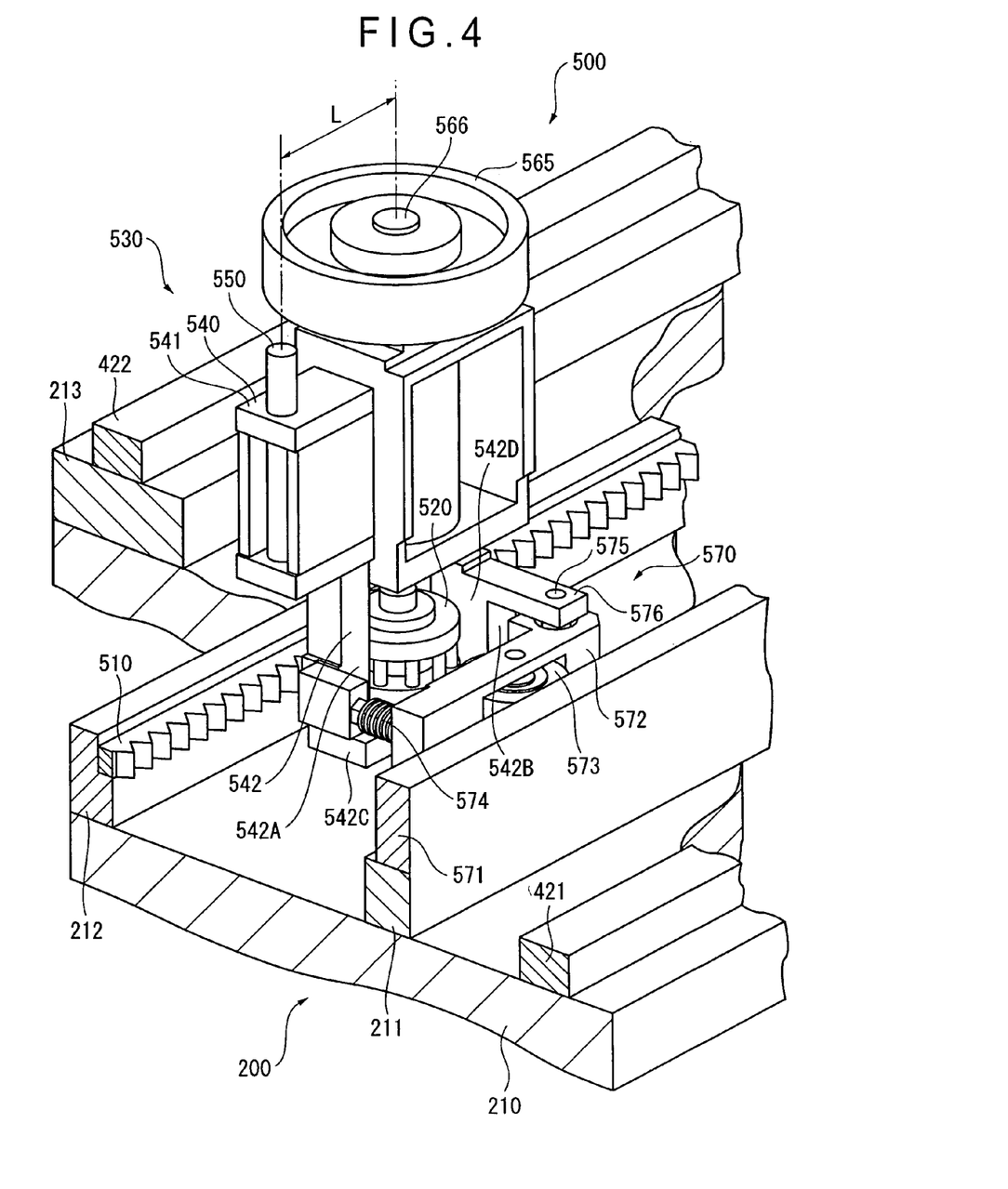
FIG. 4 is a partial view showing the drive unit when viewed from the IV direction in FIG. 3 in the embodiment.
Figure 5:
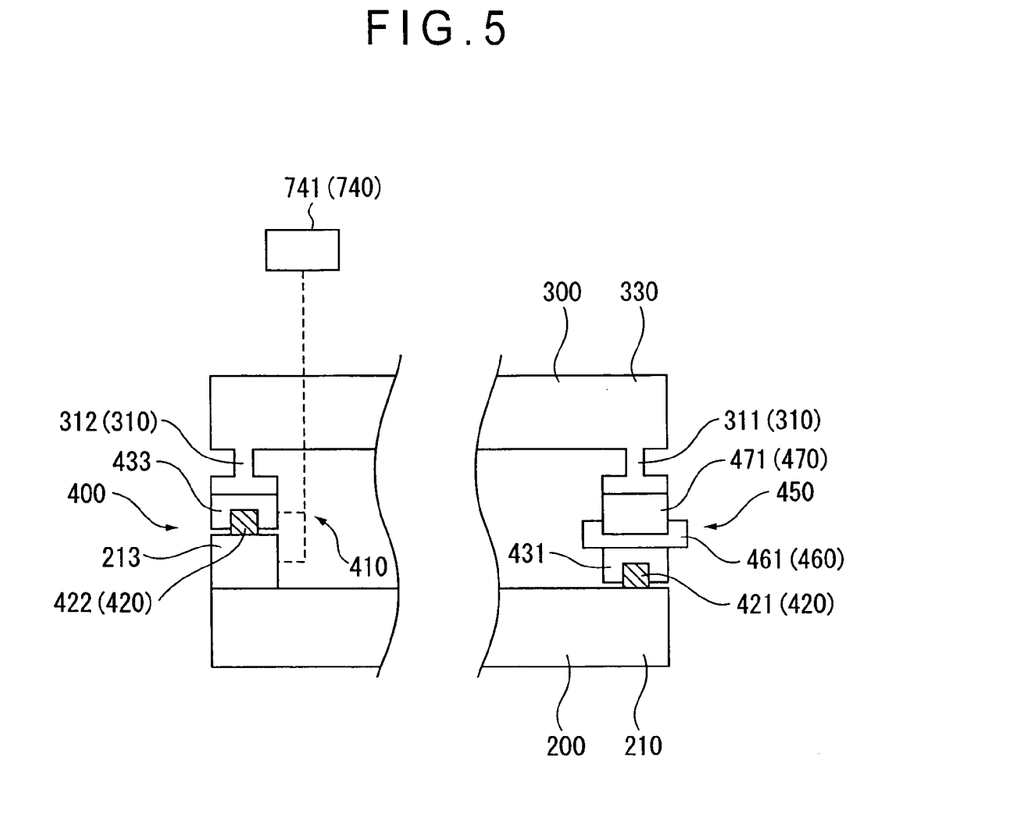
FIG. 5 is a partial view showing a guide mechanism viewed from the running direction of a running head in the embodiment.
Figure 6:
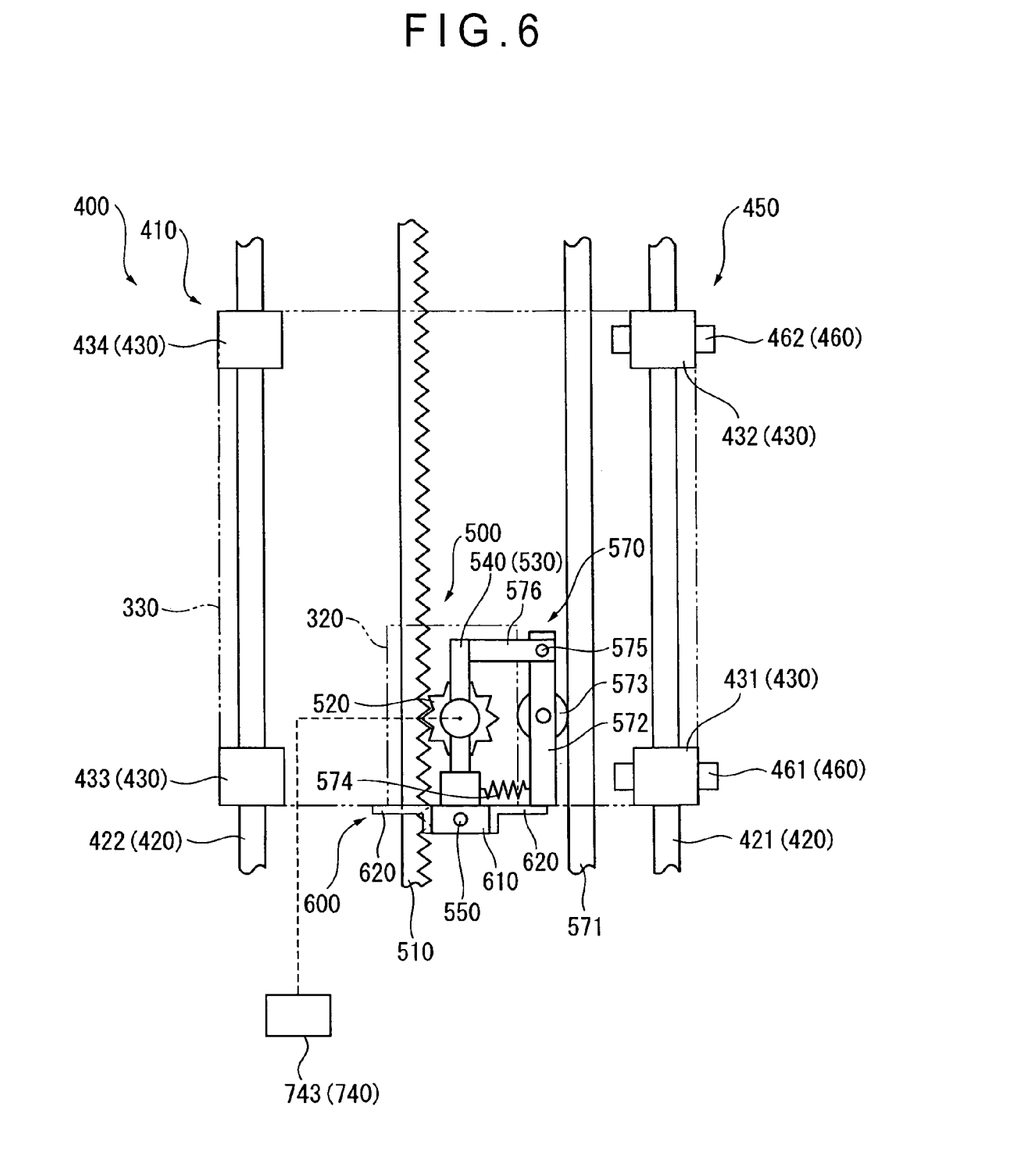
FIG. 6 is a top plain view showing the running section in the embodiment.

FIG. 1 is a general view showing a measuring instrument. FIG. 2 is an enlarged view showing a running section and a base in the state where a base cover has been removed. FIG. 3 is a partial view showing a drive unit. FIG. 4 is a partial view of the drive unit viewed from the IV direction in FIG. 3. FIG. 5 is a partial view showing a guide mechanism viewed from the running direction of a running head. FIG. 6 is a top plain view showing the running section.

A coordinate measuring machine 100 as a measuring instrument according to the present invention includes a landscape base 200, a running section 800 capable of running back and forth along a longitudinally extended direction provided on the base 200, and a measuring section 700 moved by the running section 800 and measuring a workpiece (see FIG. 1 and FIG. 2).

The base 200 includes a base portion 210, a base cover 220 spacing an accommodating space 250 with the base portion 210, and an end board 230 closing both ends of the base 200.

The base portion 210 is a longitudinally extended substantially rectangular parallelepiped with a flat upper surface on its top. The base portion 210, for instance, is made of a material with a low thermal expansion rate to avoid deformation to heat.

On the upper surface of the base portion 210, three mounts 211, 212, 213 each having a length along a longitudinal direction of the base portion 210 are arranged at a prespecified distance therebetween. The mount 211, the mount 212 and the mount 213 are arranged in order on one side edge.

The base cover 220 includes a top board 224 substantially the same shape as the upper surface of the base portion 210, a side board 225 formed by folding both side edges of the top board 224, and the accommodating space 250 provided on the upper surface side of the base portion 210 and providing a given space with the upper surface side of the base portion 210.

Three slits 221, 222, 22 having a length along a longitudinal direction are openly formed on the top board 224. Each position of the slits 221, 222, 223 are substantially corresponding to the position of the mounts 211, 212, 213.

The running section 800 includes a running head 300 running back and forth along a longitudinal direction of the base 200, a guide mechanism 400 for guiding in a running direction of the running head 300, a drive unit 500 for driving the running head 300, and a connecting unit 600 connecting the drive unit 500 with the running head 300.

The running head 300 is described below.

The running head 300 includes a running head body 330, a head cover 321 (Refer to FIG. 1), and an elevated base section 310.

The running head body 330 has a form like a depressed rectangular parallelepiped as a whole. The running head body 330 runs on the base cover 220, and the measuring section 700 is provided on an upper surface of the running head body 330.

Further, the running head body 330 includes a concave portion 320 having recesses towards the center from substantially center of one end face with given widths and being substantially rectangular at a plain view (Refer to FIG. 6), and the head cover 321 is provided so as to cover the concave portion 320.

The elevated base section 310 is provided on a bottom surface along both side edges of the running head body 330 in the upright state. An elevated base 311 is provided in the upright state on one side edge of the running head body 330 and an elevated base 312 is provided on the other side edge of the running head body 330 in the upright state.

When the running head body 330 runs on an upper surface of the base cover 220, the elevated base section 310 (the elevated bases 311, 312) is inserted into the slits 221, 223 and the bottom edge of the elevated base section 310 is positioned in the accommodating space 250 in the base 200.

The running head 300, for instance, is made of such as aluminum alloy for weight saving.

The guide mechanism 400 is described below.

The guide mechanism 400 is provided in the accommodating space 250 in the base 200.

The guide mechanism 400 includes a main guide mechanism 410 for guiding in a direction along a longitudinal direction of the base 200 (in a first direction along the running direction of the running head), and a sub-guide mechanism 450 for guiding in the orthogonal direction of a longitudinal direction of the base 200 (in a second direction which is orthogonal direction to the direction for guiding the main guide mechanism 410) (Refer to FIG. 2, FIG. 5 and FIG. 6).

Although the directions for guiding the main guide mechanism 410 and the sub-guide mechanism do not exactly intersect each other (more specifically, torsional to each other), it unit the directions projecting each direction on a surface of the base portion 210 intersect each other. In this specification, therefore, the directions for guiding the main guide mechanism 410 and the sub-guide mechanism 450 are described as being orthogonal or intersect each other.

The main guide mechanism 410 includes a main rail 420 provided along a longitudinal direction on a surface of the base portion 210, and a main slider 430 sliding on the main rail 420.

The main rail 420 is included of a first main rail 421 provided on one side edge of the base portion 210, and a second main rail 422 provided on an upper surface of the mount 213 on the other side edge of the base portion 210.

The main slider 430 is a cross sectional concaved member, and is provided across the main rail 420.

The main slider 430 is included of a first main slider 431 and a second main slider 432 sliding the first main rail 421, and a third main slider 433 and a fourth main slider 434 sliding the second main rail 422.

The first main slider 431 and the second main slider 432 are connected with a lower end of the elevated base section 310 via the sub-guide mechanism 450, and the first main slider 431 is provide on one end to side and the second main slider 432 is provided on the other end to side at lower surface sides of the running head 300.

The third main slider 433 is fixed on one end to side of the elevated base 312 and the fourth main slider 434 is fixed on the other end to side of the elevated base 312.

The sub-guide mechanism 450 includes a sub-rail 460 provided on each surface of the first main slider 431 and the second main slider 432 along a substantially orthogonal direction in a direction for guiding the main guide mechanism 410, and a sub-slider 470 sliding on the sub-rail 460.

The sub-rail 460 includes a first sub-rail 461 provide on a top surface of the first main slider 431, and a second sub-rail 462 provided on an upper surface of the second main slider 432.

The sub-slider 470 is a cross sectional concaved member and is provide across the sub-rail 460 (the first sub-rail 461 and the second sub-rail 462, and is included of a first sub-slider 471 sliding on the fist sub-rail 461 and a second sub-slider 472 sliding on the second sub-rail 462.

The first sub-slider 471 is fixed on one end to side of the elevated base 311, and the second sub-slider 472 is fixed on the other end to side of the elevated base 311.

The drive unit 500 is described below.

The drive unit 500 includes a rack 510 provided along a longitudinal direction of the base portion 210, a pinion 520 engaging with the rack 510, a swing support unit 530 supporting swings of the pinion 520, a rotary driving unit 560 rotating the pinion 520, and an biasing mechanism 570 biasing the pinion 520 towards the rack 510 (Refer to FIG. 2, FIG. 3 and FIG. 4).

The rack 510 is fixed on the mount 212 in parallel to the both rails 421, 422 between the first main rail 421 and the second main rail 422.

The rack 510 has rack teeth and a surface of the rack teeth is provided on one side surface of the rack 510 (a side surface facing to the first main rail). In other word, the direction of a normal line for the surface of the rack teeth is in parallel to the upper surface of the base portion 210 and in vertical to the direction for guiding the main guide mechanism 410.

The pinion 520 has pinion teeth engaging with the rack teeth of the rack 510 and a direction of rotation axis of the pinion 520 is perpendicular to the upper surface of the base portion 210. The pinion 520 moves back and forth along the longitudinal direction of the base 200 as rotating on the rack 510 with engagement.

One end of the swing support unit 530 is supported by a swing shaft 550 in parallel to a rotation axis of the pinion 520 and the other end thereof is capable of swinging to a direction closely by or isolating from the rack 510, and the swing support unit 530 includes a swing arm 540 supporting the pinion 520 rotatably.

The swing arm 540 includes an arm body section 541 provided on the concave portion 320 of the running head body 330, and a pinion accommodating section 542 provided in series at a lower end of arm body section 541 and accommodating the pinion 520 therein.

The arm body section 541 has the swing shaft 550 inserted into at one end and the other end thereof is capable of swinging by this swing shaft 550.

The pinion accommodating section 542 is formed as a frame having a through hole 542D vertical to the surface of the rack teeth at a lower end of the arm body section 541, and includes a one end side pillar 542A pending in series from one end to side of the arm body section 541, the other end side pillar 542B pending in series from the other end to side of the arm body section 541, and a lower frame 542C connecting to the lower edges of the one end side pillar 542A and the other end side pillar 542B. The pinion 520 is accommodated within the through hole 542D of the pinion accommodating section 542.

A line L (see FIG. 4) connecting the rotation axis of the pinion 520 to the swing shaft of the swing arm 540 is substantially in parallel to the rack 510.

A rotary driving unit 560 includes a motor (driving source) 564, a transfer mechanism 563 transferring rotary power of the motor 564, a drive gear 565 rotary driven by the motor 564 via the transfer mechanism 563, and a driving shaft 566 rotated by the drive gear 565.

A bracket 562 is provided in the protruding state in series on one side edge of the arm body section 541 (Refer to FIG. 3), and includes a housing 561. The motor 564 is provided in pending from the housing 561 and the transfer mechanism 563 having gear train and belt and pulley in the housing 561 is also provided in pending from the housing 561.

The drive gear 565 is rotatably provided on an upper surface of the arm body section 541, and a line of a rotation axis of the drive gear 565 and a line of a rotation axis of the pinion 520 are identical.

The driving shaft 566 is rotatably provided piercing into the arm body section 541 and the pinion accommodating section 542, and couples the axis of the drive gear 565 to the axis of the pinion 520. Then, rotation of the drive gear 565 is transferred to the pinion 520 by the driving shaft 566, and the pinion 520 starts rotating driven by the drive gear 565.

As the driving shaft 566 is inserted into the swing arm 540, the driving shaft 566 and the swing arm 540 are engaged with each other.

The biasing mechanism 570 includes a wall board 571 provided substantially in parallel to the rack 510 placing the pinion 520 in between, a tension roller 573 moving along the wall board 571 rotating on the wall board 571, a lever arm 572 provided substantially in parallel to the swing arm 540 and supporting the tension roller 573 rotatably with an axis substantially at the center of the lever arm 572, a spring 574 biasing to move one end of the lever arm 572 away from the swing arm 540, and a connecting rod 576 provided prudently in series on the other end of the swing arm 540 and connected rotatably to the other end of the lever arm 572 (see FIG. 4 and FIG. 6).

The wall board 571 is provided via the mount 211 on the upper surface of the base portion 210, facing to the rack 510 away for a given distance placing the pinion 520 in between.

The tension roller 573 has a rotation axis substantially in vertical to the upper surface of the base portion 210. A connecting line connecting the rotation axis of the tension roller 573 to the rotation axis of the pinion 520 substantially crosses to the rack 510.

The lever arm 572 is provided between the wall board 571 and the pinion accommodating section 542, substantially in parallel to the wall board 571 and the pinion accommodating section 542 respectively, and is capable of swinging. Besides, the tension roller 573 is provided rotatably substantially at the center of the lever arm 572. Thereby, the lever arm 572 becomes "lever" having a rotation axis of the tension roller 573 as a supporting point.

Further, the spring 574 is provided between one end of the lever arm 572 and one end of the pinion accommodating section 542 (one end side pillar 542A), and biases to move one end of the lever arm 572 away from one end of the pinion accommodating section 542 (biases to approach one end of the lever arm 572 to one end of the wall board 571).

The connecting rod 576 is provided in the protruding state in series from the other end of the pinion accommodating section 542 (the other end side pillar 542B) to the other end of the wall board 571, and the other end of the lever arm 572 is rotatably pivoted on the connecting rod 576.

When one end of the lever arm 572 is biased to move away from the rack 510 by the spring 574, the other end of the lever arm 572 is biased to move towards the rack 510. Thereby, the other end to side of the swing arm 540 is biased to move towards the rack 510 via the connecting rod 576.

The connecting unit 600 is described below.

The connecting unit 600 includes a swing holder 610, and connecting members 620, 620 (see FIG. 2 and FIG. 6).

The swing holder 610 is a frame-like component having a through hole in which the swing arm 540 is inserted by its one end so as to receive the swing arm 540 in the through hole. The swing shaft 550 is penetrated through the swing holder 610 and one end of the swing arm 540 so that the swing arm 540 is capable of swinging against the swing holder 610 around the swing shaft 550. Connecting members 620, 620 having L-like cross section connect the swing holder 610 to the running head body 330.

In this invention, the slider device includes the base 200 and the running section 800.

The measuring section 700 includes a Z-column 710 provided on an upper surface of the running head 300, and a Y-spindle 720 placed on the Z-column 710 capable of moving up and down and having a length crossing to a longitudinal direction of the base 200. The Y-spindle 720 is extensible, and is provided with a probe 730 for detecting a surface of a workpiece as attaching to a workpiece (not shown in the Figs.) at one end of the Y-spindle 720.

It is desirable that a location detector unit 740 for detecting coordinates of the probe 730 is provided at a prespecified position. The location detector unit 740 may have the arrangement described below.

Unit of detecting a location of the running head 300 may be, for instance, the displacement detector 741 (refer to FIG. 5) which detects relative amounts of displacement between the second main rail 422 and the third main slider 433 (or forth main slider 434), or a rotary detector 742 (refer to FIG. 3) which detects a number of rotating of the motor 564, or a rotary detector 743 (refer to FIG. 6) which detects a number of rotating of the pinion 520.

Moreover, it is desirable that a displacement detector unit for detecting an amount of lifting of the Y-spindle 720 against Z-column 710 and an amount of extension of the Y-spindle 720 is provided.

An action of a coordinate measuring machine having the configuration as described above is described below.

At first, an action of the running head 300 running back and forth towards a longitudinal direction of the base 200 is described below.

When the motor 564 rotates, a driving force of the motor 564 is transferred to the drive gear 565 via the transfer mechanism 563, and the drive gear 565 is driven for rotating.

The driving shaft 566 rotates by rotating of the drive gear 565 and a rotating force of the drive gear 565 is transferred to the pinion 520, and the pinion 520 rotates following the rotation of the drive gear 565.

When the pinion 520 rotates in the state of engaging to the rack 510, the pinion 520 moves along the rack 510.

When the driving shaft 566 moves along the rack 510 together with the pinion 520, as the driving shaft 566 is engaged to the swing arm 540 (the driving shaft 566 is penetrated through the swing arm 540), the swing arm 540 moves along the rack 510 together with the driving shaft 566.

As the swing arm 540 is connected to the swing holder 610 via the swing shaft 550 (the swing shaft 550 is penetrated through the swing holder 610 and the swing arm 540), the swing holder 610 moves along the rack 510 together with the swing arm 540 (the drive unit 500).

As the swing holder 610 is fixed by the connecting members 620, 620 on the running head 300, the running head 300 runs along the rack 510 together with the swing holder 610.

In this step, as the third main slider 433 and the fourth main slider 434 are slidably engaged in the second main rail 422 of the main guide mechanism 410, the running head 300 runs in a direction for guiding the main guide mechanism 410.

An action of moving the running head 300, which is moved by the rotation of the pinion 520, is described below in a case where the rack 510 has teeth of different heights.

If the rack 510 has teeth with different heights, a force acting in the vertical direction (the orthogonal direction to a running direction) to the rack 510 effects on the pinion 520, then the pinion 520 vibrates on the orthogonal direction to a running direction.

When the pinion 520 vibrates in the orthogonal direction to a running direction, the driving shaft 566 vibrates together with the pinion 520.

As the swing arm 540 sets in the state of capable of swinging around one end of the swing shaft 550, the other end of the swing arm 540 vibrates together with the pinion 520 and the driving shaft 566.

Then, vibration of the pinion 520 in the direction orthogonal to the running direction is absorbed in swings of the swing arm 540 so that vibration of the pinion 520 is not transmitted to the swing holder 610 which is placed at the end of the swing arm 540, then the running head 300 runs in a direction for guiding by the main guide mechanism 410.

At this time, as the other end of the pinion accommodating section 542 is biased towards the rack 510 by the biasing mechanism 570, the pinion 520 and the rack 510 were engaged at a constant engagement force.

Then, an action when an amount of thermal expansion is different between the running head 300 and the base portion 210 at temperature change is described below.

When the running head 300 is made of a light material such as aluminum alloy and the base portion 210 is made of a low thermal expansion material, an amount of thermal expansion (an amount of thermal deformation) of the running head 300 and the base portion 210 becomes different at temperature change.

Especially, when an amount of deformation becomes different in a lateral direction (the orthogonal direction to a running direction) of them, a width of the running head 300 becomes different against a distance between the first main rail 421 and the second main rail 422.

In this case, as the sub-rail 460 (the first sub-rail 461 and the second sub-rail 462) is provided on a surface of the first main slider 431 and the second main slider 432, and the sub-slider 470 (the first sub-slider 471 and the second sub-slider 472) is inserted into the sub-rail 460, the sub-slider 470 slides in the orthogonal direction to a running direction corresponding to the deformation of the running head 300.

Then, the difference in the amount of deformation between the running head 300 and the base portion 210 is absorbed.

Next, measurement of a workpiece is described below.

When measuring a workpiece, the workpiece is scanned by the probe 730 attaching to the object. In other word, the actions such as a running action of the running head 300, a lifting action of the Y-spindle 720 and an expanding action of the Y-spindle 720 are controlled by a designated control unit so that the probe 730 keeps attaching to the object.

With the aforementioned embodiment having the configuration as described above, the following effects can be achieved.

(1) In case of existing some height differences between the rack teeth of the rack 510, since the pinion 520 is swingably held by the swing arm 540, the pinion 520 can be swung substantially in the orthogonal direction to the rack 510. Thus, damage on the pinion 520 and the rack 510 can be avoided and their geometric accuracy can be maintained without having an excess engagement pressure between the pinion 520 and the rack 510.

(2) Even when some height difference between the rack teeth of the rack 510 exists, the stress in a direction orthogonal to the rack 510 can be absorbed by swings of the swing arm 540. Accordingly, stress different from the direction for guiding does not act on the main guide mechanism 410 (especially, on the second main rail 422, the third main slider 433 and the fourth main slider 434), thus the main guide mechanism 410 can avoid having damage and can maintain geometrical accuracy. Consequently, the running head 300 can move in high accuracy.

(3) As the pinion 520 is biased towards the rack 510 by the biasing mechanism 570 via the swing arm, engagement force between the rack 510 and the pinion 520 can be kept in constant, accordingly, disengagement between the rack 510 and the pinion 520 can be avoided as well as large backrush.

(4) As the swing arm 540 is swingably held on the rack 510 almost in parallel thereto, the pinion 520 can be biased to in a direction substantially parallel to the tooth surface of the rack 510 when the other end of the swing arm 540 is biased to the rack 510, so that an appropriate engagement force can be kept in any relative movement direction between the rack 510 and the pinion 520 (a running direction of the running head 300).

(5) The other end of the swing arm 540 can be biased to the rack 510 in the simple lever principle by swinging the lever arm 572 using the rotation axis of the tension roller 573 as a supporting point.

(6) Since the sub-guide mechanism 450 is provided, even if the difference of the amount of thermal deformation is generated between the running head 300 and the base portion 210 due to temperature change, the difference of thermal amount of deformation can be absorbed by the sub-slider 470 sliding on the sub-rail 460 in the direction orthogonal to the direction for guiding the main guide mechanism 410. Consequently, the main guide mechanism 410 is not affected by stress from the direction other than the direction for guiding, so that geometric accuracy can be maintained.

(7) Since a difference in the thermal amount of deformation generated between the running head 300 and the base portion 210 is allowable, the running head 300 can be made of a light material (such as aluminum alloy). As a result, running speed of the running head 300 can be increased.

(8) In case where a parallelism between the first main rail 421 and the second main rail 422 is not accurate, differences of the space between both main rails are absorbed by the sub-guide mechanism 450 (the sub-rail 460 and the sub-slider 470). Thus, even if the parallelism does not have adequate accuracy between the first main rail 421 and the second main rail 422, accuracy of running speed of the running head 300 can be maintained. Consequently, as accuracy for parts and assembly can be reduced, costs for parts and assembly can be reduced.

This invention is not limited to the embodiment described above but includes any modification and improvements as long as an object of the present invention can be achieved.

For instance, in the embodiment described above, the rack is provided on the base portion and the pinion is provided on the running head, but on the contrary the rack may be provided on the running head and the pinion may be provided on the base portion.

Also, a configuration of the biasing mechanism is not limited to the foregoing embodiment, but may employ any configuration in which the swing end of the swing arm is biased to the rack.

For instance, in the guide mechanism, it is explained that the main rail are two, but the main rails may be three or four. In this case, the main slider sliding on one of these main rails is fixed on the running head and the sub-guide mechanism is provided on the upper surface of the main slider sliding on the other main rails. Further, as in the foregoing embodiment, the sub-guide mechanism includes the sub-rail and the sub-slider, but for instance, a ball may be provided between the main slider and the running head or the main slider and the running head may be connected with an elastic material such as a spring.

The priority application Number JP2004-115968 upon which this patent application is based is hereby incorporated by reference.

What is claimed is:

1. A slider device comprising:
   a base;
   a running head slidably provided on the base;
   a main guide mechanism for guiding in a first direction in which the running head runs; and
   a sub-guide mechanism allowing displacement in a second direction different from the first direction,
   wherein the main guide mechanism includes a plurality of main rails including a first main rail and a second main rail provided on the base substantially in parallel to each other along the first direction, and main sliders including a first main slider and a second main slider respectively sliding on the first and second main rails, and
   the first main slider sliding on the first main rail is directly provided on the running head, and the second main slider sliding on the second main rail is provided on the running head through the sub-guide mechanism.

2. The slider device according to claim 1, wherein, the sub-guide mechanism including a sub-rail extending along the second direction different from the first direction, and a sub-slider sliding on the sub-rail.

3. A measuring instrument comprising:
a slider device including: a base; a running head slidably provided on the base; a main guide mechanism for guiding in a first direction in which the running head runs; and a sub-guide mechanism allowing displacement in a second direction different from the first direction;
a measuring section moved by the running head and having a detecting section for detecting a workpiece by scanning a surface of the workpiece; and
a position detector for detecting coordinate positions of the detecting section,
wherein the main guide mechanism includes plurality of main rails including a first main rail and a second main rail provided on the base substantially in parallel to each other along the first direction, and main sliders including a first main slider and a second main slider respectively sliding on the first and second main rails, and
the first main slider sliding on the first main rail is directly provided on the running head, and the second main slider sliding on the second main rail is provided on the running head through the sub-guide mechanism.

4. The measuring instrument according to claim 3, wherein, the sub-guide mechanism including a sub-rail extending along the second direction different from the first direction, and a sub-slider sliding on the sub-rail.

* * * * *

UNITED STATES PATENT AND TRADEMARK OFFICE
CERTIFICATE OF CORRECTION

PATENT NO. : 7,249,420 B2 Page 1 of 1
APPLICATION NO. : 11/099762
DATED : July 31, 2007
INVENTOR(S) : Otsubu et al.

It is certified that error appears in the above-identified patent and that said Letters Patent is hereby corrected as shown below:

Column 12, Line 16, (Claim 3, Line 13), after "includes" insert --a--.

Signed and Sealed this

Twentieth Day of November, 2007

JON W. DUDAS
*Director of the United States Patent and Trademark Office*